Oct. 28, 1924.  
G. W. BOYD  
1,513,479  
TIRE MOUNTING DEVICE  
Filed May 29, 1922  
2 Sheets-Sheet 1
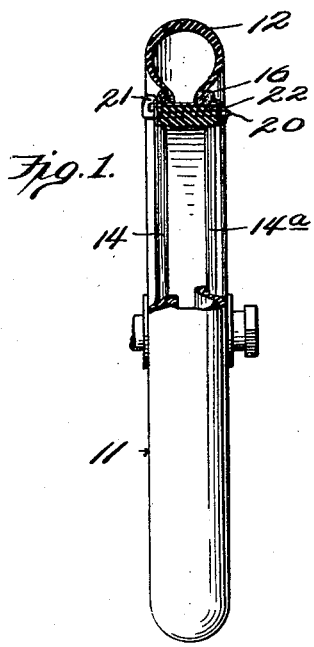
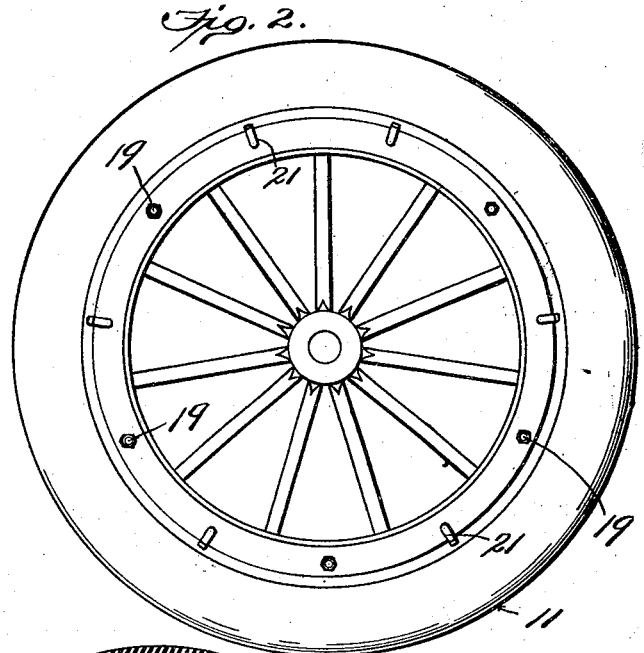
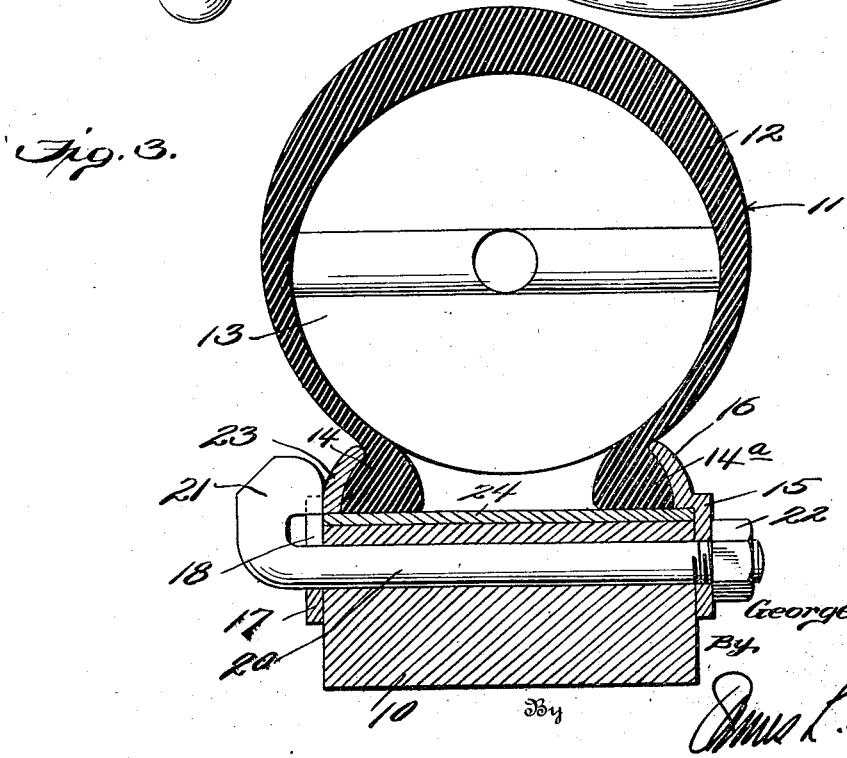
Inventor  
George W. Boyd  
By  
James L. Norris  
Attorney

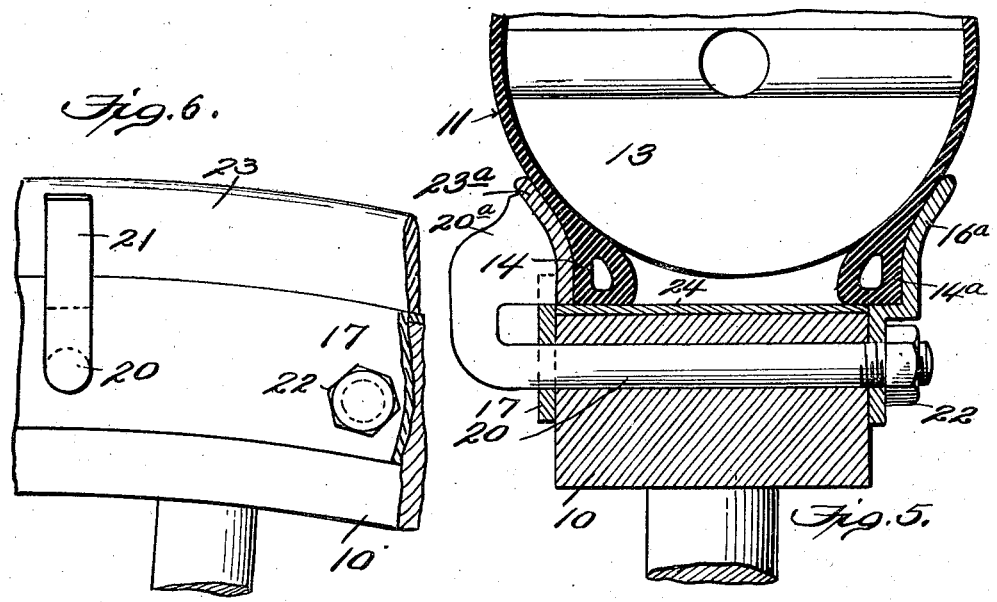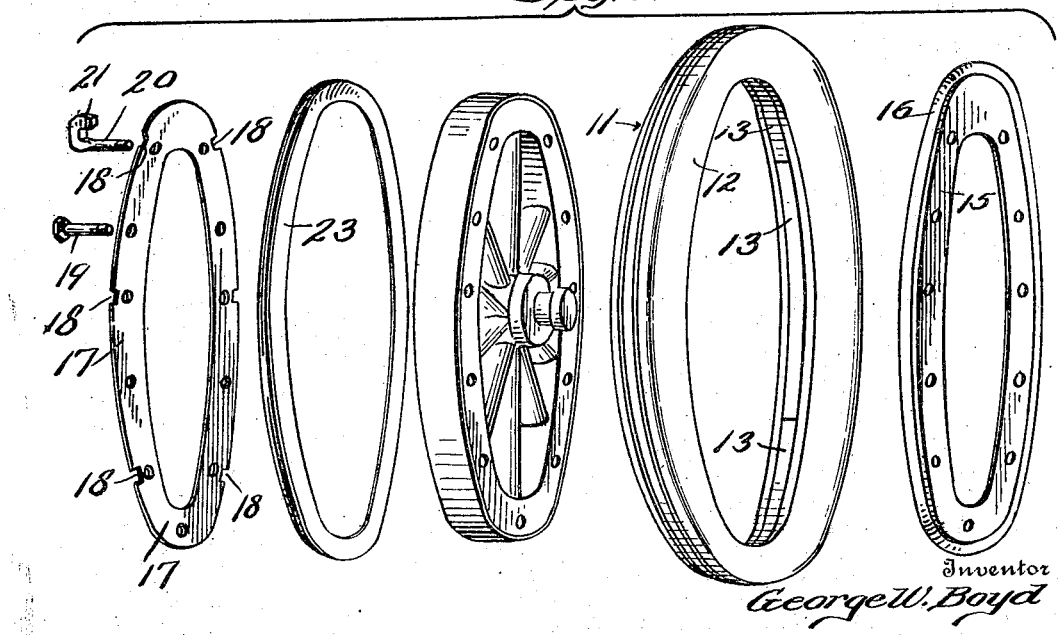

Patented Oct. 28, 1924.

1,513,479

UNITED STATES PATENT OFFICE.

GEORGE W. BOYD, OF NASHVILLE, TENNESSEE.

TIRE-MOUNTING DEVICE.

Application filed May 29, 1922. Serial No. 564,390.

*To all whom it may concern:*

Be it known that I, GEORGE W. BOYD, a citizen of the United States, residing at Nashville, in the county of Davidson and State of Tennessee, have invented new and useful Improvements in Tire-Mounting Devices, of which the following is a specification.

The present invention relates to vehicle wheels and particularly to means for securing a tire to the felly of the wheel and for binding the tire casing firmly about the filler.

The main purpose of the present invention is to produce effective means for attaching the core of a solid tire to the felly of a wheel which may be adjusted to take up any slack in the tire casing which has developed as a result of road wear or stretching. The invention is particularly applicable where a solid tire is used made up of sections held together by a surrounding casing.

In the drawings:

Fig. 1 shows a peripheral view of a wheel partly in section, showing the tire mounted thereon by means of the device of my invention.

Fig. 2 is a side elevation of the same.

Fig. 3 is a cross section of a tire on an enlarged scale compared with Figs. 1 and 2, and showing the same mounted on the felly of a wheel.

Fig. 4 is a view showing the parts of the wheel shown in Figs. 1, 2 and 3 disassembled.

Fig. 5 is a slightly different form of mounting.

Fig. 6 is a detail view of the form of the device shown in Fig. 5.

Referring to the drawings in detail, 10 designates the felly of a wheel, 11 a tire positioned on the felly and comprising a casing 12 and a solid rubber filler 13 preferably made up of sections. The casing 12 is open on its inner periphery and is preferably provided with outstanding ribs 14 and 14ª adjacent said opening.

In the use of tires of this character where a filler of solid rubber is enclosed within a casing, it frequently happens that after a certain amount of use the casing becomes loose on the filler as a result of wear and stretching. In order to maintain the casing tight on the filler, I have provided means for securing the tire to the felly of the wheel which at the same time may be adjusted to draw the casing tightly about the filler.

The device by which I accomplish this purpose comprises a flange member 15 which is secured to one side of the felly 10 and is provided with a curved portion 16 against which one rib 14ª of the tire casing is adapted to rest. On the opposite side of the felly is secure a flange 17 provided on its outer edge with notches 18. The flanges 15 and 17 and the felly 10 are provided with apertures adapted to be brought in alinement, and bolts 19 are passed through alternate groups of the alined apertures for securing the flanges to the felly, and through the remaining apertures are passed adjustment bolts 20 having hooks formed on one end which are provided with heads 21 adapted to fit in the notches 18 and to be adjusted transversely of the periphery of the felly by means of nuts 22 threaded to the opposite ends of the adjustment bolts. Resting on the periphery of the felly of the wheel is a ring 23 corresponding in shape to the curved portion 16 of the flange 15 and adapted to fit against the rib 14 of the tire casing. This ring 23 is free to move transversely of the felly of the wheel and is prevented from slipping off of the wheel by the flange 17. The heads of the bolts are guided in adjusting the same and are prevented from turning by the sides of the notches 18.

By this construction it will be seen that when the tire casing 12 becomes loose about the filler, it may be readily tightened by adjustment of the bolts 20.

In the modification shown in Fig. 5 the construction is the same as that shown in Fig. 3 except that the flange 16ª is offset outwardly from the felly and the ring 23ª is flared outwardly instead of being curved inwardly as shown in Fig. 3, the head of the bolt 20ª being correspondingly formed. This construction is adapted to tire casings where there is no distinctive rib on the edge of the opening.

In both constructions the felly of the wheel may be provided with a wear plate 24 on which the ring 23 slides in being adjusted.

What is claimed as new is:

1. In combination with a wheel means for securing a tire to the felly of the wheel and for holding said casing tight about a filler, comprising a flange secured to one side of the felly of the wheel, a movable ring on the opposite side of said felly and bolts having hooked ends adjustable transversely through the felly of the wheel, the hooked end of each of said bolts having a head bearing against the movable ring, means associated with the opposite end of each of said bolts for drawing said bolts transversely of said felly, and a flange secured to the side of the felly adjacent the movable ring and having notches in one edge thereof to receive the heads of said hooks.

2. A device for simultaneously securing a tire core to the felly of a wheel and for holding a casing tightly about said core comprising a fixed flange secured to one side of the felly, a notched flange secured to the other side of the felly, a movable ring resting on the periphery of the felly and bolts spaced about and extending transversely through the felly having rebent portions positioned in said notches and provided with heads conforming to the shape of said movable ring, said bolts being adjustable transversely of the wheel.

3. In combination with the wheel of a vehicle, means for drawing a casing mounted on said wheel about a filler contained in said casing, said means comprising a fixed flange secured to the felly of the wheel and adapted to abut against one side of the casing, an outwardly and laterally flaring movable ring having one edge resting on the periphery of the felly and adapted to abut against the other side of the casing, bolts extending through the felly of the wheel, each having a rebent portion formed at one end extending in parallelism with the shank of the bolt and provided with a head conforming with the shape of said ring and extending throughout substantially the entire width of the latter, and means associated with the opposite ends of said bolts for drawing said heads and said ring toward said flange.

In testimony whereof I have hereunto set my hand in presence of two subscribing witnesses.

GEORGE W. BOYD.

Witnesses:
J. O. KIRKPATRICK,
CHAS. G. AKIN.